Figure 7:
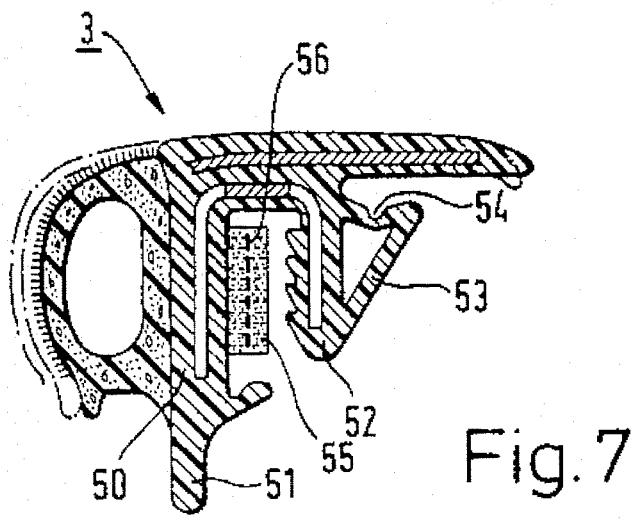

United States Patent [19]

Brocke et al.

[11] Patent Number: 5,538,317
[45] Date of Patent: Jul. 23, 1996

[54] SEAL DESIGN

[75] Inventors: Rolf Brocke, Wangen; Klaus Glagow, Wasserburg, both of Germany

[73] Assignee: Metzeler Automotive Profiles GmbH, Lindau/Bodensee, Germany

[21] Appl. No.: 557,368

[22] Filed: Nov. 13, 1995

Related U.S. Application Data

[63] Continuation of Ser. No. 213,115, Mar. 14, 1994.

[30] Foreign Application Priority Data

Mar. 15, 1993 [DE] Germany ............... 43 08 218.1

[51] Int. Cl.$^6$ ................................ B60J 10/12
[52] U.S. Cl. ................... 296/216; 49/490.1
[58] Field of Search ............ 213/115; 296/216, 296/93; 49/482.1, 489.1, 490.1, 495.1, 498.1

[56] References Cited

U.S. PATENT DOCUMENTS

| | | | |
|---|---|---|---|
| 2,772,915 | 12/1956 | Renno | 296/146.16 X |
| 3,171,886 | 3/1965 | Holt et al. | 52/204.597 X |
| 4,477,507 | 10/1984 | Kunert | 52/204.597 X |
| 4,610,907 | 9/1986 | Elvira | 49/498.1 X |
| 4,749,203 | 6/1988 | Bright | 49/498.1 X |
| 5,170,587 | 12/1992 | Nakatani et al. | 296/216 X |
| 5,310,236 | 5/1994 | Tamura et al. | 296/93 |

FOREIGN PATENT DOCUMENTS

| | | | |
|---|---|---|---|
| 330771 | 9/1989 | European Pat. Off. | 296/216 |
| 148719 | 8/1985 | Japan | 296/216 |
| 3227724 | 10/1991 | Japan | 296/216 |
| 1378615 | 12/1974 | United Kingdom | 49/498.1 |

*Primary Examiner*—Dennis H. Pedder
*Attorney, Agent, or Firm*—Cumpston & Shaw

[57] ABSTRACT

With a sealing arrangement for the gap between the rigid cover of a vehicle roof and the roof opening, by which the cover, comprised of a glass panel, is glued on its rim area to an underlying base frame that protrudes at the side, and which is connected between glass panel periphery and roof opening with a gap seal having a protruding edge of the base frame, a simpler assembly with fewer individual components is provided in compliance with the invention's specifications in that the gap seal (3) features a U-shaped clamping area (13), provided with a reinforcement made of an elastomer, having an overlapping lip-shaped protrusion (15) over the edge of the glass panel (2), as well as a sealing lip (17) running around the edge of the glass panel (2) on the side of the clamping area (13), as well as a hollow chamber profile (20) of sponge rubber that is extruded onto the other side, and that the gap seal is secured with its U-shaped clamping area (13) onto a vertically protruding edge (12) of the base frame (10).

16 Claims, 2 Drawing Sheets

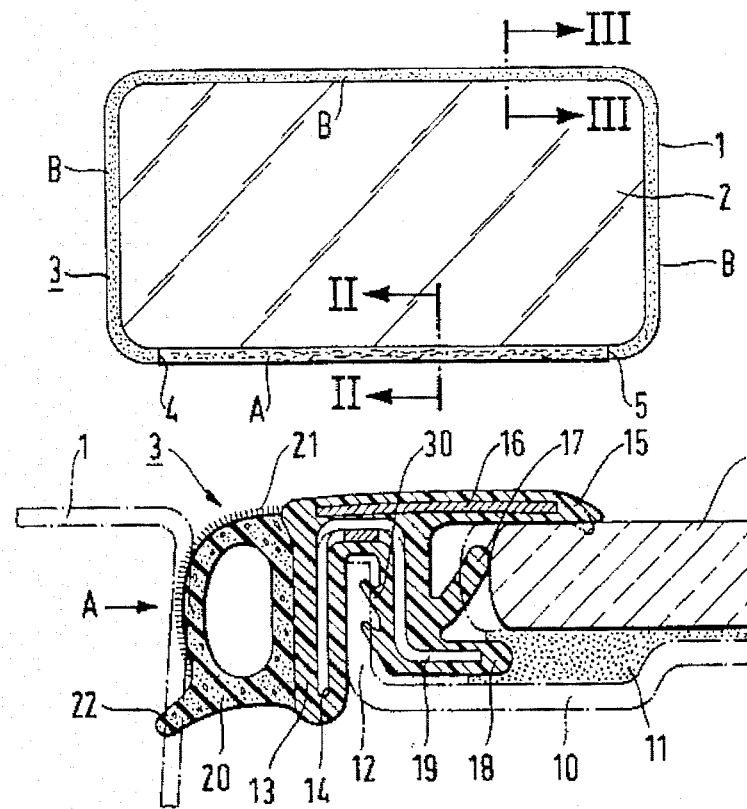
Fig. 1
Fig. 2
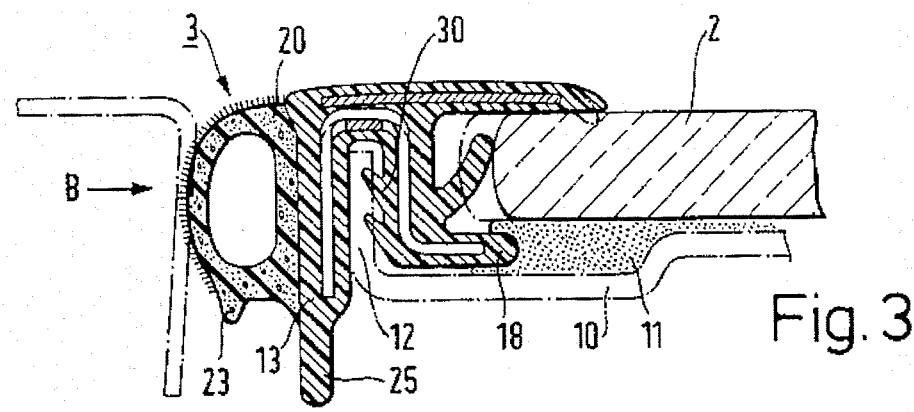
Fig. 3
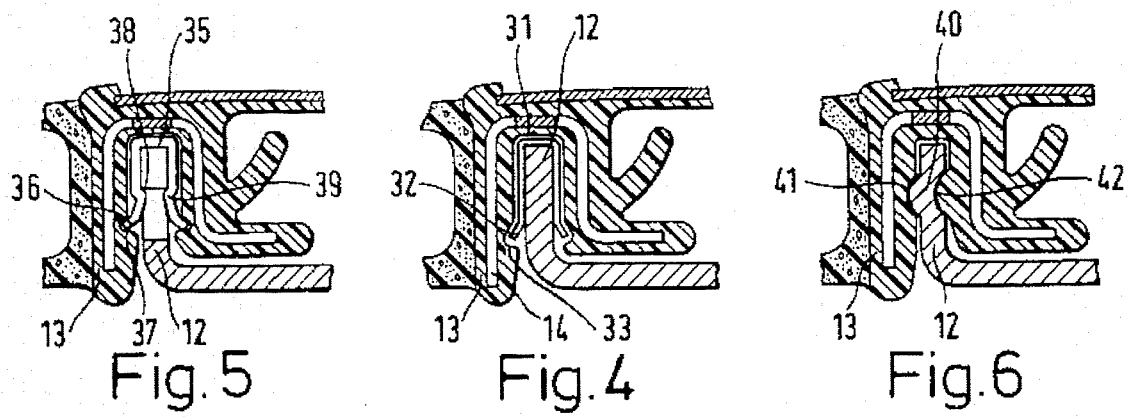
Fig. 5  Fig. 4  Fig. 6

SEAL DESIGN

This application is a continuation of copending application Ser. No. 08/213,115 filed on Mar. 14, 1994.

The invention relates to a sealing arrangement for the gap between the rigid cover of a vehicle roof and the roof opening, by which the cover, comprised of a glass panel, is glued on its rim area to a base frame that underlies it and protrudes at the side, and which is connected between glass panel circumference and roof opening with a gap seal having a protruding edge of the base frame.

A cover of this kind is known from DE-OS 36 39 894. The latter cover consists of many individual components, which must be put together in a complicated manner during the final assembly. It has an additional T-shaped aluminum profile attached that runs around the glass panel, which is between the glass panel and the actual seal, and which must additionally be anchored against the protruding edge of the base frame. Consequently, several phases of operation and auxiliary devices are required to create a finished cover.

By contrast, the procedure required for the present invention to create a sealing arrangement for such a cover is considerably simpler, as regards manufacturing, and especially considering that it can be assembled out of fewer individual components.

To accomplish this task in compliance with invention specifications it is provided that the gap seal features a U-shaped clamping area with a reinforcement made of an elastomer, having an overlapping lip-shaped protrusion over the rim of the glass panel, a sealing lip running around the rim of the glass panel on the one side of the clamping area, as well as a hollow chamber profile of foam rubber, that extrudes onto the other side, and that the gap seal is secured with its U-shaped clamping area onto a vertically protruding edge of the base frame.

In this way it is possible to manufacture the entire gap seal as a single-piece module and as a closed frame, which must then only be pushed from above onto the edge of the base frame.

In this manner the gap seal, which extends around the glass panel and the base frame, can consist of a profile section A that extends over the front rim of the cover and has a sealing lip protruding downward from the foam rubber profile to the roof opening, and of a profile section B that extends over the remaining periphery of the cover and has a vertically downward protruding sealing ridge from the leg of the U-shaped clamping area that adjoins onto the foam rubber profile, whereby both of the profile sections are durably connected to make a one-piece frame at their joining points.

The elastomer portion of the gap seal consists suitably of EPDM with a Shore-A-Hardness of approximately 70.

The reinforcement of the U-shaped clamping area can consist of a vulcanized punch strip with notches on the side edges.

Additionally, it is expedient if the lip-shaped protrusion features a stiffener in the form of an aluminum band or punch strip that extends up above the U-shaped reinforcement. Moreover, for further bracing it is expedient when the U-shaped clamping area on its leg on the glass frame side features a horizontal protrusion, which is directed toward the glass panel and into which extends a flexed end of the reinforcement.

Here glass frame and base frame can be joined by means of an adhesive layer in such a manner that the free end of the protrusion is also embedded into the adhesive layer.

Furthermore, it is expedient if the gap lip, which is arranged against the edge of the glass panel, is designed as a triangular shaped hollow sealing chamber with a pressure notch in the horizontal leg.

There are different possibilities for fastening the U-shaped clamping area on the vertically protruding edge.

In this manner the U-shaped clamping area can feature on its inner side several diagonally downward protruding clamping lips.

Furthermore, it is possible to provide for the restraining of this U-shaped clamping area onto the vertically protruding edge of the base frame by the use of U-shaped clamps with leg ends curved away toward the outside, which leg ends protrude into corresponding recesses of the U-shaped clamping area.

A further possibility exists, in that the vertically protruding edge features a convexity along its side, which edge on the one side engages with a corresponding recess of the one U-leg and whereby the other U-leg is provided with a similar convexity, which engages with the reverse side recess of the edge, that occurs by means of the convexity.

A further very advantageous method of fastening exists, in that the U-shaped clamping area is joined with the vertically protruding edge by means of a heat-activated adhesive.

Such a heat-activated adhesive layer suitably features an inlaid copper braid that is electrically charged for the warming and activating of the adhesive.

Here the heat-activated adhesive mass is suitably placed onto an inner side of the U-shaped clamping area, and in particular extruded onto it and is activated after the clamping area is pushed onto the vertically protruding edge.

Figure 8:
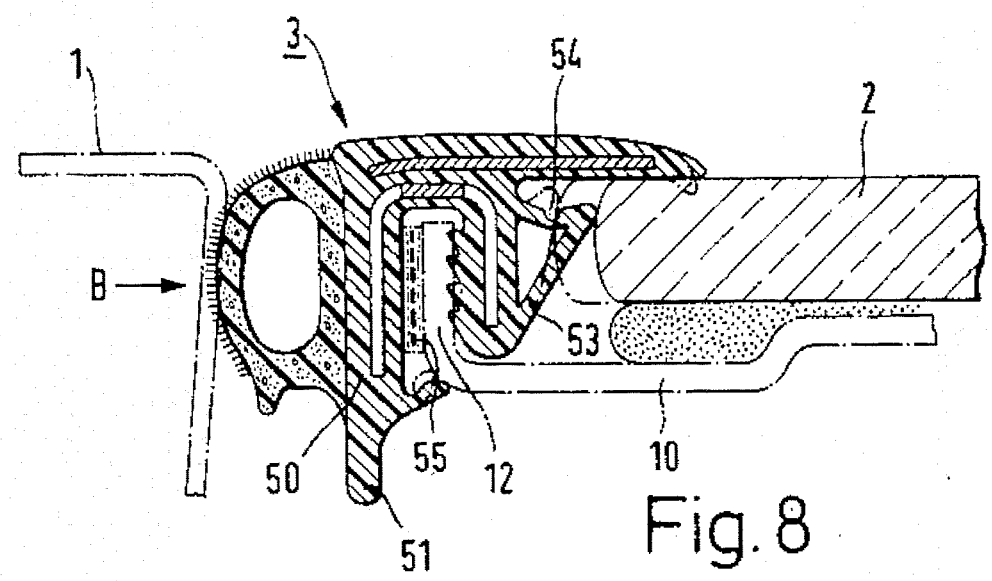
Figure 9:
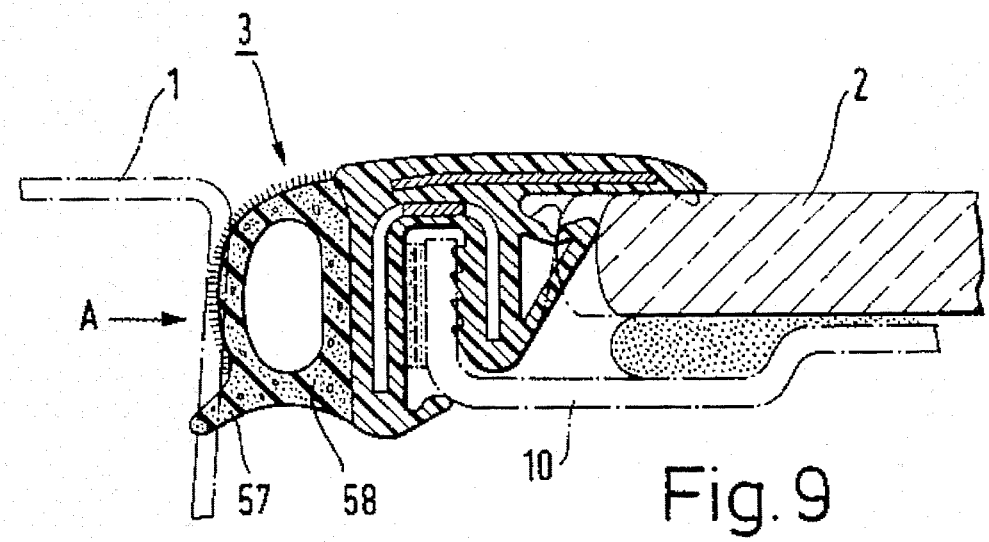

By means of a schematic diagram, the composition and manner of operation of embodiments of the invention are more clearly illustrated. Here is shown in:

FIG. 1 is a top plan view of the cover within the roof opening,

FIG. 2 is a longitudinal section of the edge area of the cover at the front edge with a mounted seal, corresponding to section II—II in FIG. 1, FIG. 3 is a seal of the same kind as in FIG. 2 for the remaining peripheral areas of the cover, corresponding to section III—III in FIG. 1, FIG. 4 is the design of a clamping arrangement for bracing of the gap seal, FIG. 5 is a further elaboration of such a clamping arrangement, FIG. 6 is a third variation for a similar clamping arrangement, FIG. 7 is a cross section of a completed gap seal with heat-activated adhesive, FIG. 8 is an appropriate gap seal for the remaining peripheral areas of the cover, and FIG. 9 is a longitudinal section of the rim area of the cover at the front edge with a seal corresponding to FIG. 7.

According to the top plan view of a vehicle roof with a rectangular roof opening 1 illustrated in FIG. 1, the cover, which consists on the whole of a glass panel 2, is surrounded on all sides by a gap seal 3 fitting onto the roof opening. Here the gap seal 3 consists of two distinct profile sections, namely the profile section A at the front edge of the cover for opening and the profile section B, that surrounds the remaining areas of the cover 2. Here the profile section A features two joining points 4 and 5 with profile section B, at which points the profile sections A and B are glued to each other, making a closed framework.

In FIG. 2 is shown a longitudinal section of the rim area of the cover, corresponding to section II—II in FIG. 1. Accordingly, the glass panel 2 is first joined to an underlying base frame 10, which projects outward along the side of the rim area, by an adhesive placed in between to form a single module.

The base frame 10 features on its outer periphery a vertically protruding edge 12, up against which the gap seal 3 of the profile area A is pressed, which gap seal is constructed in detail as follows.

The seal features first a U-shaped clamping area 13 made of an elastomer, whereby this elastomer can, for example, consist of EPDM with a shore-A-hardness of approximately 70. This clamping area 13 is fitted with a corresponding U-shaped reinforcement 14 in the form of a vulcanized punch strip with notches along the side edge. From the upper side of this clamping area 13, a lip-shaped protrusion 15 protrudes out to the glass panel 2, which overlays the rim of the glass panel 2 and is likewise fitted with a bracing 16 in the form of an aluminum belt or punch belt, whereby this bracing 16 reaches out over the reinforcement 14 of the clamping area 13. Furthermore, sealing lip 17 is provided for, which protrudes from the clamping area 13 to the running edge of the glass panel 2 and which also compensates for the tolerances between it and the glass panel 2. Further, from the lower end of the leg of the clamping area 13 on the glass panel side, a protrusion 18 is set facing the glass panel 2, into which protrusion 18 a flexed end 19 of the reinforcement 14 extends.

On the opposite side of the clamping area 13 in the direction of the roof cutout 1, a hollow chamber profile 20, which is made of foam rubber and is extruded onto the clamping area 13, is fitted on its upper and front side with a coating for sealing off and for better sliding at the roof cutout 1.

FIG. 3 shows a longitudinal section of the profile areas B on the remaining sides of the glass panel 2. Here the seal 3 differs from the profile area A, as shown in FIG. 2, only to the extent that the outlying leg of the clamping area 13 features a vertically protruding sealing ridge 25, as well as a sealing lip 23, which likewise protrudes downward from the foam rubber area 20 and which corresponds to the sealing lip 22 that protrudes forward to the roof cutout 1, according to FIG. 2.

For assembly the two profile sections A and B are glued together at their joining points 4 and 5 and as a closed frame are pressed onto the vertically protruding edge 12 of the base frame 10. For better anchoring the adhesive 11 is heated, so that the protrusions 18 of the clamping area 13 are simultaneously embedded into the adhesive 11 and thereby are additionally anchored.

To enhance anchoring of the glued-together gap seal 3, different possibilities are provided. According to FIG. 3 the U-shaped clamping area 13 features on its inner side several diagonally protruding clamping lips 30, which are set opposite to the removal direction from the edge and thereby hinder the removal of the profile.

Further clamping possibilities are shown in FIGS. 4 through 6. According to FIG. 4, a U-shaped clamp 31 is placed on the vertically protruding edge 12 and features its ends 32 bent away, which protrude into recesses 33 on the inner side of the U-shaped clamping area. The clamps 31 can be attached securely to the edge 12, so that a secure restraining of the gap seal is possible.

According to FIG. 5 a somewhat differently formed clamp 35 is pushed onto the vertically protruding edge 12. Here the clamp 35 likewise features ends protruding outward, which protrude into corresponding recesses 37 of the U-shaped clamping area 13. Additionally, the vertically protruding edge shows indentations, into which corresponding indented areas 39 of the clamp 35 fit. Here as well a secure anchoring is ensured.

A further possibility is presented in FIG. 6. According to this the vertically protruding edge 12 features a convexity 40 along the side, whereby the convex side engages with a corresponding recess 41 on the one U-leg of the clamping area 13, while the other U-leg possesses a similarly shaped convexity 42, which engages with the corresponding depression of the convexity 40. Here as well, a secure restraining of the gap seal is ensured.

A somewhat differently formed and secured gap seal 3 is presented in the FIGS. 7 through 9. FIG. 7 shows a cross section of this gap seal for the profile area B. Accordingly, a U-shaped clamping area 50 is provided with a downward projecting protrusion 50 at a leg of the clamping area. The other leg 52 features, conversely, a triangular shaped hollow seal chamber 53, in whose horizontal leg a pressure notch is provided.

As one may see from the corresponding longitudinal section corresponding to FIG. 8 for the installed condition, this triangular hollow seal chamber 53 seals against the peripheral rim of the glass panel 2 and, by means of the pressure notch 54, compensates for the tolerances between gap seal and glass panel 2.

Additionally, a heat-activated adhesive 55 is placed onto, i.e., extruded onto the inner side of the exterior leg of the U-shaped clamping area 50. Such a heat-activated adhesive consists, for example of a PU granulate, in side of which, for example, a copper braid 56 is embedded that is coupled to an electric source. With the flow of current and the resulting heating of the copper braid 54, the surrounding adhesive also becomes hot and is activated, so that after termination of the electric current and a cooling of the adhesive mass, a secure bond with the adjacent module is ensured.

As one may see from FIG. 8, the heat-activated adhesive 55 is at first somewhat pressed together after the pressing of the gap seal 3 onto the vertically protruding edge 12 of the frame 10 and forms after its activation a secure bond between the U-shaped clamping area 50 and the vertically protruding edge 12 of the frame 10.

FIG. 9 shows a cross section of this gap seal 3 in the area of the profile section A at the front rim of the roof opening, whereby the profile differs from the profile area B only in that the vertical protrusion 51, according to FIG. 8, is absent and instead a diagonally downward protruding sealing lip 57 from the foam rubber area 56 to the roof cutout 1 is featured.

In all then, there results for the gap between glass cover and the encircling roof cutout a gap seal, which can be pre-finished as a complete, rectangular profile frame and then attached as one piece onto the vertically protruding edge of the base frame underlying the glass panel and then securely restrained.

What is claimed is:

1. A gap seal for a gap between a rigid cover of a vehicle roof and a roof opening in which the cover includes a transparent panel glued on its rim area to an underlying base frame having a vertically protruding side edge, the gap seal comprising: an inverted U-shaped clamping area having inner and outer legs, an overlapping lip-shaped protrusion extending from said inner leg and adapted to extend over the rim area of the transparent panel, a sealing lip on the inner leg for engaging an edge of the transparent panel rim area under pressure, and a sealing member on the outer leg for engaging an edge of the roof opening;

the overall thickness of the inner leg of the U-shaped clamping area being not substantially greater than the width of a space between the vertically protruding side edge of the base frame and an edge of the transparent panel so that the gap seal can be vertically installed on the vertically protruding side edge of the base frame while the base frame is attached to the transparent panel.

2. A gap seal according to claim 1, comprising:

a profile section (A) that extends over a portion of the rim area of the panel and has a sealing lip protruding downwardly from the sealing member to the roof opening, and a profile section (B) that extends over the remaining peripheral area of the transparent panel and has a vertically downwardly protruding sealing ridge from the outer leg of the U-shaped clamping area and that both of the profile sections are connected at first and second joining points to make a one-piece gap seal frame.

3. A gap seal according to claim 1, in which the clamping area of the gap seal comprises EPDM with a shore-A-hardness of approximately 70.

4. A gap seal according to claim 1, in which the U-shaped clamping area comprises a reinforcement.

5. A gap seal according to claim 1, in which the lip-shaped protrusion comprises an aluminum band.

6. A gap seal according to claim 4, in which the U-shaped clamping area comprises a horizontal protrusion on its inner leg and an end of the reinforcement extends into the horizontal protrusion.

7. A gap seal according to claim 6, comprising an adhesive layer between the end of the protrusion and the glass panel.

8. A gap seal according to claim 1, in which the sealing lip comprises a triangular shaped hollow sealing chamber with a pressure notch in a horizontal leg thereof.

9. A gap seal according to claim 1, in which the U-shaped clamping area comprises several diagonally protruding clamping lips on its inner side.

10. A gap seal according to claim 1, in which the restraining of the U-shaped clamping area onto the vertically protruding edge of the base frame comprises U-shaped clamps with leg ends curved away from the vertically protruding edge, which leg ends protrude into corresponding recesses of the U-shaped clamping area.

11. A gap seal according to claim 1, in which the vertically protruding side edge comprises a convexity, which on one side engages with a corresponding recess of the outer leg and whose inner leg possesses a similarly shaped convexity, which engages with a recess on the reverse side of the edge.

12. A gap seal according to claim 1, in which the U-shaped clamping area is bonded to the vertically protruding edge by means of a heat-activated adhesive.

13. A gap seal according to claim 12, in which the heat-activated adhesive comprises an inlaid copper braid for the activation of the adhesive.

14. A gap seal according to claim 12 in which the heat-activated adhesive is placed onto an inner side of the U-shaped clamping area and after pushing of the clamping area onto the vertically protruding edge, is pressed together and activated.

15. A gap seal according to claim 13, in which the heat-activated adhesive is placed onto an inner side of the U-shaped clamping area and after pushing of the clamping area onto the vertically protruding edge is pressed together and activated.

16. The gap seal of claim 1, in which the lip-shaped protrusion comprises a punch strip.

* * * * *